(12) United States Patent
Li et al.

(10) Patent No.: US 12,232,165 B2
(45) Date of Patent: Feb. 18, 2025

(54) CONTENTION WINDOW ADJUSTMENT METHOD AND DEVICE, STORAGE MEDIUM AND ELECTRONIC DEVICE

(71) Applicant: ZTE Corporation, Guangdong (CN)

(72) Inventors: Xincai Li, Guangdong (CN); Yajun Zhao, Guangdong (CN)

(73) Assignee: ZTE Corporation, Guangdong (CN)

( * ) Notice: Subject to any disclaimer, the term of this patent is extended or adjusted under 35 U.S.C. 154(b) by 445 days.

(21) Appl. No.: 17/214,152

(22) Filed: Mar. 26, 2021

(65) Prior Publication Data

US 2021/0219337 A1 Jul. 15, 2021

Related U.S. Application Data

(63) Continuation of application No. PCT/CN2019/106681, filed on Sep. 19, 2019.

(30) Foreign Application Priority Data

Sep. 27, 2018 (CN) .......................... 201811134486.2

(51) Int. Cl.
*H04W 74/00* (2009.01)
*H04L 1/1812* (2023.01)
(Continued)

(52) U.S. Cl.
CPC .......... *H04W 74/002* (2013.01); *H04L 1/1819* (2013.01); *H04L 1/1896* (2013.01); *H04W 72/0453* (2013.01); *H04W 74/0816* (2013.01)

(58) Field of Classification Search
CPC ........... H04W 74/008; H04W 74/0816; H04W 72/0453; H04L 1/1819; H04L 1/1896
See application file for complete search history.

(56) References Cited

U.S. PATENT DOCUMENTS

2017/0005768 A1 1/2017 Yin et al.
2018/0152267 A1 5/2018 Andreoli-Fang et al.
(Continued)

FOREIGN PATENT DOCUMENTS

CN 101621829 A 1/2010
CN 101998662 A 3/2011
(Continued)

OTHER PUBLICATIONS

Search Report and Written Opinion received for Singapore Application No. 11202102755X mailed Jan. 10, 2023 (7 pages).
(Continued)

*Primary Examiner* — Saad A. Waqas
(74) *Attorney, Agent, or Firm* — Crowell & Moring LLP

(57) ABSTRACT

A contention window adjustment includes: determining, according to a type parameter, an access level of channel access performed by a base station at a second moment, where the type parameter is used for indicating a type of transmitted data during the base station performing the channel access at the second moment; and adjusting, according to the access level and an adjustment parameter, a size of a contention window corresponding to the second moment, where the adjustment parameter includes a first adjustment ratio, a first frequency domain position where the base station performs channel access at a first moment, and a second frequency domain position where the base station performs the channel access at the second moment.

6 Claims, 3 Drawing Sheets

First moment

Second moment (51) Int. Cl.
*H04L 1/1867* (2023.01)
*H04W 72/0453* (2023.01)
*H04W 74/0816* (2024.01)

(56) References Cited

U.S. PATENT DOCUMENTS

| | | | |
|---|---|---|---|
| 2018/0263054 A1 | 9/2018 | Wang et al. | |
| 2019/0053265 A1* | 2/2019 | Kim | H04L 5/0044 |
| 2019/0268912 A1* | 8/2019 | Myung | H04W 72/23 |
| 2021/0044392 A1* | 2/2021 | Myung | H04L 1/1864 |

FOREIGN PATENT DOCUMENTS

| | | | | |
|---|---|---|---|---|
| CN | 102904670 A | | 1/2013 | |
| CN | 108141311 A | | 6/2018 | |
| EP | 3651534 B1 | * | 7/2021 | ........... H04L 1/1614 |
| WO | WO 2017/050276 A1 | | 3/2017 | |
| WO | WO 2017/069798 A1 | | 4/2017 | |
| WO | WO 2017/133266 A1 | | 8/2017 | |
| WO | WO 2018/012919 A1 | | 1/2018 | |
| WO | WO 2018/017187 A1 | | 1/2018 | |
| WO | WO-2019156542 A1 | * | 8/2019 | ........... H04L 5/0055 |

OTHER PUBLICATIONS

Extended European Search Report received for Application No. EP 19865247.1 mailed Jan. 5, 2022 11 pages.
3GPP TS 37.213, V15.1.0, 3$^{rd}$ Generation Partnership Project: Technical Specification Group Radio Access Network: Physical layer procedures for shared spectrum channel access (Release 15), Sep. 2018 20 pages.
First Examination Report issued for India Patent Application No. 202127017566 mailed Jan. 4, 2023 (7 pages).
International Search Report and Written Opinion received for Application No. PCT/CN2019/106681 mailed Dec. 18, 2019, (8 pages).
Notice of Eligibility for Grant and Examination Report dated Jul. 4, 2024, issued for Singapore Patent Application No. 11202102755X (4 pp.).
First Office Action dated Jun. 27, 2024, issued for Australian Patent Application No. 2019351324 (2 pp.).
Communication for EP Application No. 24 185 471.0 dated Oct. 25, 2024 (8 pp.).
Office Action issued for Korea Patent Application No. 10-2021-7011611 dated Dec. 20, 2024 (4 pages).

* cited by examiner

Receive indication information sent by a base station, where the indication information is used for indicating demodulation results of transmitted data in HARQ processes corresponding to a reference time domain resource when the base station performs channel access at a first moment —S202

Adjust a size of a contention window corresponding to a second moment according to the indication information —S204

CONTENTION WINDOW ADJUSTMENT METHOD AND DEVICE, STORAGE MEDIUM AND ELECTRONIC DEVICE

RELATED APPLICATION

This application is a continuation application of PCT Patent Application No. PCT/CN2019/106681 filed Sep. 19, 2019 entitled "CONTENTION WINDOW ADJUSTMENT METHOD AND DEVICE, STORAGE MEDIUM AND ELECTRONIC DEVICE," which claims priority to Chinese patent application No. 201811134486.2 filed on Sep. 27, 2018. The entireties of the above applications are incorporated herein by reference.

TECHNICAL FIELD

The present disclosure relates to the field of communications and, specifically, to a contention window adjustment method and apparatus, a storage medium, and an electronic device.

BACKGROUND

A project in which the Fifth Generation mobile networks (5G) New Radio (NR) technology uses unlicensed carriers to perform operations on NR in Unlicensed Spectrum (NR-U) has been established and studied in the Third Generation Partnership Project (3GPP). One of the objectives of the above operations is to standardize the way of using unlicensed carriers to perform the NR operation deployment. According to current regulatory requirements, a device needs to perform channel access prior to data transmission by using an unlicensed carrier and needs to adjust a contention window (CW) in the channel access process. In the related art, the standardized adjustment process of the contention window in the channel access process in the Licensed-Assisted Access (LAA) is established. However, for the NR, since the NR introduces some new technical features compared to the Long Term Evolution (LTE), such as broadband bandwidth part (BWP) operation, the transmission of a coding block group (CBG) and corresponding CBG acknowledgement/negative acknowledgement (ACK/NACK) feedback, flexible scheduling and feedback timing, and configured grant, the current standardized adjustment process of the contention window in the channel access process in the related art cannot be applied in the NR.

For the problem that the adjustment of the contention window cannot be achieved in the NR currently, no scheme has been proposed in the related art.

SUMMARY

Embodiments of the present disclosure provide a contention window adjustment method and apparatus, a storage medium, and an electronic device to at least solve the problem that the adjustment of the contention window cannot be achieved in the NR in the related art.

According to an embodiment of the present disclosure, a contention window adjustment method is provided. The method includes the steps described below.

An access level of channel access performed by a base station at a second moment is determined according to a type parameter, where the type parameter is used for indicating a type of transmitted data during the base station performing the channel access at the second moment.

A size of a contention window corresponding to the second moment is adjusted according to the access level and an adjustment parameter, where the adjustment parameter includes a first adjustment ratio, a first frequency domain position where the base station performs channel access at a first moment, and a second frequency domain position where the base station performs the channel access at the second moment, where the first moment is earlier than the second moment.

The first adjustment ratio is used for indicating one of the following:
 a ratio of the number of pieces of acknowledgement (ACK) information to the number of physical uplink shared channels (PUSCHs), where the pieces of ACK information are detected corresponding to demodulation of transmitted data in a reference time domain resource when the base station performs the channel access at the first moment and the PUSCHs are transmitted in the reference time domain resource; or
 a ratio of the number of pieces of negative acknowledgement (NACK) information to the number of physical downlink shared channels (PDSCHs), where the pieces of NACK information are detected corresponding to demodulation of transmitted data in a reference time domain resource when the base station performs the channel access at the first moment and the PDSCHs are transmitted in the reference time domain resource.

Optionally, the type parameter includes at least one of the following: a traffic type of the transmitted data during the base station performing the channel access at the second moment, a physical channel type of the transmitted data during the base station performing the channel access at the second moment, or a logical channel type of the transmitted data during the base station performing the channel access at the second moment.

Optionally, the step in which the size of the contention window corresponding to the second moment is adjusted according to the access level and the adjustment parameter includes the following steps.

The first adjustment ratio is adjusted according to an overlapping relationship between the first frequency domain position and the second frequency domain position.

The size of the contention window corresponding to the second moment is adjusted according to the access level and the adjusted first adjustment ratio.

Optionally, the step in which the first adjustment ratio is adjusted according to the overlapping relationship between the first frequency domain position and the second frequency domain position includes one of the following steps.

In a case where at least part of the second frequency domain position overlaps the first frequency domain position, the first adjustment ratio is adjusted according to a second adjustment ratio, where the second adjustment ratio is used for indicating a ratio of a first bandwidth corresponding to the first frequency domain position to a second bandwidth corresponding to the second frequency domain position.

In a case where the first frequency domain position is a subset of the second frequency domain position, the first adjustment ratio is maintained.

In a case where no overlap exists between the first frequency domain position and the second frequency domain position, the size of the contention window corresponding to the second moment is adjusted according to a minimum value of the contention window within a value range of the contention window, where the value range corresponds to the access level.

In a case where at least part of bandwidths in the second frequency domain position overlap bandwidths in the first frequency domain position, the first adjustment ratio is adjusted according to a third adjustment ratio, where the third adjustment ratio is used for indicating a ratio of bandwidths in an overlapping area of the first frequency domain position and the second frequency domain position to bandwidths corresponding to the second frequency domain position.

Optionally, the first frequency domain position includes at least one of: a sub-channel in frequency domain, a BWP in frequency domain, or a resource block (RB) granularity in frequency domain; and the second frequency domain position includes at least one of: a sub-channel in frequency domain, a BWP in frequency domain, or an RB granularity in frequency domain.

Optionally, a transmission data type of transmitted data during the base station performing the channel access at the first moment includes: a coding block group (CBG) or a transport block (TB).

Optionally, the step in which the size of the contention window corresponding to the second moment is adjusted according to the access level and the adjustment parameter includes the following steps.

The number of pieces of first NACK information is acquired, where the first NACK information is used for indicating, in response to transmitting data based on the CBG, the NACK information detected corresponding to the demodulation of the transmitted data in the reference time domain resource when the base station performs the channel access at the first moment.

The size of the contention window corresponding to the second moment is adjusted according to the access level and one of a fourth adjustment ratio or an adjusted fourth adjustment ratio, where the fourth adjustment ratio is used for indicating a ratio of the number of the pieces of first NACK information to the number of data blocks transmitted in the reference time domain resource, and the adjusted fourth adjustment ratio is an adjustment ratio obtained by adjusting the fourth adjustment ratio according to a relationship between the CBG and the TB.

Optionally, the step in which the fourth adjustment ratio is adjusted according to the relationship between the CBG and the TB includes one of the following steps.

In response to detecting to be the NACK information for transmitted data corresponding to a plurality of CBGs corresponding to the TB, data transmitted based on the TB is counted as first NACK information, and the fourth adjustment ratio is adjusted according to the ratio of the number of the pieces of first NACK information to the number of the data blocks transmitted in the reference time domain resource.

In response to detecting to be the NACK information for transmitted data corresponding to one of a plurality of CBGs corresponding to the TB, data transmitted based on the TB is counted as NACK information, and the fourth adjustment ratio is adjusted according to a ratio of the number of the pieces of NACK information to the number of the data blocks transmitted in the reference time domain resource.

In a case where the number of CBGs, among a plurality of CBGs corresponding to the TB, for which transmitted data is detected to be NACK information reaches a predetermined threshold, data transmitted based on the TB is counted as NACK information, and the fourth adjustment ratio is adjusted according to a ratio of the number of the pieces of NACK information to the number of the data blocks transmitted in the reference time domain resource.

The fourth adjustment ratio is adjusted according to the number of CBGs corresponding to each of TBs.

Optionally, the step in which the size of the contention window corresponding to the second moment is adjusted according to the access level and the adjustment parameter includes the following steps.

The number of pieces of first sub-NACK information is acquired, where each of the pieces of first sub-NACK information is used for indicating a respective one of pieces of first NACK information, detected corresponding to data transmitted corresponding to the CBG mapped into the reference time domain resource, and the respective one of the pieces of first NACK information is used for indicating, in response to transmitting data based on the CBG, NACK information detected corresponding to the demodulation of the transmitted data in the reference time domain resource when the base station performs the channel access at the first moment.

The size of the contention window corresponding to the second moment is adjusted according to the access level and a ratio of the number of the pieces of first sub-NACK information to the number of data blocks transmitted in the reference time domain resource.

Optionally, the step in which the size of the contention window corresponding to the second moment is adjusted according to the access level and the adjustment parameter includes the following steps.

An NACK information threshold is preset according to a ratio of CBGs and/or TBs in transmitted data blocks to the transmitted data blocks.

The size of the contention window corresponding to the second moment is adjusted according to the access level and the NACK information threshold.

Optionally, the reference time domain resource includes at least one of the following.

In a case where data starts to be transmitted from one symbol in a symbol set {0, 1, 2, 3, 4, 5, 6} after the base station performs the channel access at the first moment, the reference time domain resource is a first slot in which data is transmitted, where the first slot is used for indicating a first one of slots in which data is transmitted.

In a case where data starts to be transmitted from one symbol in a symbol set {7, 8, 9, 10, 11, 12, 13} after the base station performs the channel access at the first moment, the reference time domain resource is a first slot in which data is transmitted and a second slot in which data is transmitted, where the second slot is used for indicating a second one of slots in which data is transmitted.

Optionally, in a case where the transmitted data in the first slot is a physical downlink control channel (PDCCH) and the transmitted data in the second slot is a PUSCH, the contention window corresponding to the second moment is expanded in a case where the following condition is satisfied.

The condition is that a ratio of the number of pieces of ACK information generated by transmitting the PUSCH in the second slot to the number of PUSCHs transmitted in the second slot does not reach a preset threshold.

Optionally, in a case where the transmitted data in the first slot is a PDCCH and a PDSCH and the transmitted data in the second slot is a PUSCH, the contention window corresponding to the second moment is expanded in a case where at least the following condition is satisfied.

The condition is that a ratio of the number of pieces of NACK information generated by transmitting the PDSCH in the first slot and by transmitting the PUSCH in the second slot to a sum of the number of PDSCHs transmitted in the first slot and the number of PUSCHs transmitted in the second slot exceeds a preset threshold.

Optionally, the step in which the size of the contention window corresponding to the second moment is adjusted according to the access level and the adjustment parameter includes the following steps.

A value range of the contention window is acquired according to the access level, where the value range corresponds to the access level.

A minimum value of the contention window or a value of a contention window before subjected to adjustment at the second moment is selected, within the value range of the contention window, as an initial value of the contention window corresponding to the second moment for the adjustment.

The size of the contention window corresponding to the second moment is adjusted according to the initial value of the contention window and the adjustment parameter.

Optionally, the step in which the size of the contention window corresponding to the second moment is adjusted according to the initial value of the contention window and the adjustment parameter includes one of the following steps.

In a case where the first adjustment ratio exceeds a preset threshold and the value of the contention window before subjected to the adjustment at the second moment corresponding to the access level is less than a maximum value of the contention window within the value range, the contention window corresponding to the second moment is expanded.

In a case where the value of the contention window before subjected to the adjustment at the second moment corresponding to the access level is equal to a maximum value of the contention window within the value range, the size of the contention window corresponding to the second moment is maintained.

In a case where the number of times that the value of the contention window before subjected to the adjustment at the second moment corresponding to the access level is equal to a maximum value of the contention window within the value range reaches a preset threshold, a value of the contention window corresponding to the second moment is adjusted as a minimum value of the contention window within the value range.

Optionally, in a case where a PDSCH transmitted in the reference time domain resource is scheduled by a PDCCH corresponding to the first frequency domain position, negative ACK information detected corresponding to the demodulation of the transmitted data in the reference time domain resource when the base station performs the channel access at the first moment is counted as NACK information.

Optionally, in a case where a PDSCH transmitted in the reference time domain resource is scheduled by a PDCCH not corresponding to the first frequency domain position, negative HARQ-ACK information detected corresponding to the demodulation of the transmitted data in the reference time domain resource when the base station performs the channel access at the first moment is ignored.

Optionally, the method further includes the following step: in a case where PDSCHs with a plurality of ports are adopted in the reference time domain resource to send data, NACK information of a respective one PDSCH corresponding to each of the plurality of ports is counted separately.

According to another embodiment of the present disclosure, a contention window adjustment method is further provided. The method includes the steps described below.

Indication information sent by a base station is received, where the indication information is used for indicating demodulation results of transmitted data in hybrid automatic repeat request (HARQ) processes corresponding to a reference time domain resource when the base station performs channel access at a first moment.

A size of a contention window corresponding to a second moment is adjusted according to the indication information, where the first moment is earlier than the second moment.

Optionally, the indication information includes at least one of the following: downlink control information of an uplink grant, downlink feedback information (DFI), or downlink control information for triggering configured grant retransmission.

Optionally, the step in which the size of the contention window corresponding to the second moment is adjusted according to the indication information includes one of the following steps.

In response to reversing an new data indicator (NDI) corresponding to at least one HARQ process of the HARQ processes corresponding to the reference time domain resource in the indication information, a minimum value of the contention window within a value range corresponding to an access level corresponding to channel access performed at the second moment is used as a value of the contention window corresponding to the second moment.

In response to displaying DFI corresponding to at least one HARQ process of the HARQ processes corresponding to the reference time domain resource in the indication information as an ACK, a minimum value of the contention window within a value range corresponding to an access level corresponding to channel access performed at the second moment is used as a value of the contention window corresponding to the second moment.

In response to reversion of the NDI and/or display of the DFI information as an NACK occurring in none HARQ process of the HARQ processes corresponding to the reference time domain resource in the indication information, a size of a content window before subjected to adjustment at the second moment corresponding to an access level corresponding to channel access performed at the second moment is expanded within a corresponding value range, and a value of the expanded contention window is used as a value of the contention window corresponding to the second moment.

In response to receiving no uplink grant (UL grant) information and/or DFI information within a contention window timer, a value of a content window before subjected to adjustment at the second moment corresponding to an access level corresponding to channel access performed at the second moment is used as a value of the contention window for the channel access at the second moment.

According to another embodiment of the present disclosure, a contention window adjustment apparatus is further provided. The apparatus includes a determination module and a first adjustment module.

The determination module is configured to determine, according to a type parameter, an access level of channel access performed by a base station at a second moment, where the type parameter is used for indicating a type of transmitted data during the base station performing the channel access at the second moment.

The first adjustment module is configured to adjust, according to the access level and an adjustment parameter, a size of a contention window corresponding to the second moment, where the adjustment parameter includes a first adjustment ratio, a first frequency domain position where the base station performs channel access at a first moment, and a second frequency domain position where the base station performs the channel access at the second moment, where the first moment is earlier than the second moment.

The first adjustment ratio is used for indicating one of the following:

a ratio of the number of pieces of ACK information to the number of PUSCHs, where the pieces of ACK information are detected corresponding to demodulation of transmitted data in a reference time domain resource when the base station performs the channel access at the first moment and the PUSCHs are transmitted in the reference time domain resource; or a ratio of the number of pieces of NACK information to the number of PDSCHs, where the pieces of NACK information are detected corresponding to demodulation of transmitted data in a reference time domain resource when the base station performs the channel access at the first moment and the PDSCHs are transmitted in the reference time domain resource.

According to another embodiment of the present disclosure, a contention window adjustment apparatus is further provided. The apparatus includes a reception module and a second adjustment module.

The reception module is configured to receive indication information sent by a base station, where the indication information is used for indicating demodulation results of transmitted data in HARQ processes corresponding to a reference time domain resource when the base station performs channel access at a first moment.

The second adjustment module is configured to adjust a size of a contention window corresponding to a second moment according to the indication information, where the first moment is earlier than the second moment.

According to another embodiment of the present disclosure, a storage medium is further provided. The storage medium has a computer program stored thereon, where the computer program is configured to, when executed, perform steps in any one of method embodiments described above.

According to another embodiment of the present disclosure, an electronic device is further provided. The electronic device includes a memory and a processor, where the memory is configured to store a computer program, and the processor is configured to execute the computer program to perform steps in any one of method embodiments described above.

According to the present disclosure, the access level of the channel access performed by the base station at the second moment can be determined according to the type of transmitted data during the base station performing the channel access at the second moment, and the adjustment of the size of the contention window can be achieved on the basis of the access level and according to the first frequency domain position where the base station performs channel access at the first moment, the second frequency domain position where the base station performs the channel access at the second moment, and the ratio corresponding to ACK information or NACK information detected corresponding to demodulation of transmitted data in the reference time domain resource when the base station performs the channel access at the first moment. Therefore, according to the present disclosure, the problem can be solved that the adjustment of the contention window cannot be achieved in the NR in the related art, so that the adjustment operation for the contention window can be achieved in the NR.

BRIEF DESCRIPTION OF DRAWINGS

The drawings described herein are used for providing a further understanding of the present disclosure, and form a part of the present disclosure. The exemplary embodiments and descriptions thereof in the present disclosure are used for explaining the present disclosure, and do not form improper limits to the present disclosure. In the drawings.

DETAILED DESCRIPTION

Hereinafter, the present disclosure will be described in detail with reference to the drawings and in conjunction with embodiments. It is to be noted that if not in collision, the embodiments and features therein in the present application may be combined with each other.

It is to be noted that the terms "first", "second" and the like in the description, claims and drawings of the present disclosure are used for distinguishing between similar objects and are not necessarily used for describing a particular order or sequence.

To further illustrate the difference between the adjustment of the contention window in the NR and under the LAA standards, the following is a detailed description of the channel access process in the NR.

There are many problems in the use of unlicensed carriers in the NR. First, in some countries and regions, there are corresponding policies regulating the use of the unlicensed spectrum. For example, a device, before using an unlicensed carrier to send data, must perform a channel access process, that is, the device needs to perform the operation of Listen Before Talk (LBT), which can be called clear channel assessment (CCA). Only the device that successfully performs the above LBT can send data on the unlicensed carrier, and then a channel occupation time (COT) is initiated for data transmission.

The channel access process may involve the adjustment of the contention window. The above-mentioned contention window adjustment and the channel access process are basically as follows: before each time the channel is to be contended for, the device generates a random number N, where the value of N is a counter, and the value range of N is [0, CW]. Then, the LBT evaluation is performed to determine whether the channel is occupied. If the channel is occupied, the value of N is unchanged, and the LBT detection continues to be performed. If the channel is not occupied, the value of N is reduced by 1, and then whether the value of N is reduced to 0 is determined. If the value of N is reduced to 0, data is sent; otherwise, the LBT detection continues to be performed. The above CW is the contention window, and its corresponding value is {3, 7, 15, 31, 63, 127, 255, 511, 1023}. For different channel access levels, the value sets of the CW corresponding to the different channel access levels are different, and each access level corresponds to a minimum CW and a maximum CW. The initial value of the CW is generally taken as the minimum value, and the CW used for performing the LBT for each subsequent channel access is adjusted based on the results of the last LBT.

The performing of the operations about the contention window described above in the NR has the following problems.

In the LAA standards, the range of the LBT is within the entire system bandwidth, such as 20 M or 10 M, so that the frequency domain position of the contention in the contention channel process is not changed. Therefore, a set of CW adjustment rules can always be used in the LAA standards. However, for the NR, since the NR adopts the broadband operation, one carrier may correspond to multiple BWPs, that is, a BWP used in the current data transmission may be different from a BWP used in the last data transmission. In a case where the BWP in which the base station or the user equipment (UE) performs the LBT in the current time is different from the BWP in which the base station or the UE performs the LBT in the last time, the adjustment method for the contention window in the LAA standards cannot be applied in the NR.

Moreover, a transmission data object that the contention window adjustment refers to in the LAA standards is a TB, while with the introduction of the CBG-based scheduling and the HARQ-ACK feedback of the CBG in the NR, the TB-based method of the contention window adjustment in the LAA standards cannot be applied to the NR.

In addition, a reference subframe that the contention window adjustment in the LAA standards is based on is determined according to a fixed timing relationship. Since the NR supports flexible scheduling feedback timing, scheduling of the Non-slot, and multiple starting points, the reference subframe cannot be determined through the existing fixed timing relationship.

On the basis of the above, for how to adjust the contention window in the channel access process in which a terminal uses a configured grant to send data for uplink in the NR, no scheme has been proposed in the LAA standards.

Embodiment One

Figure 1:
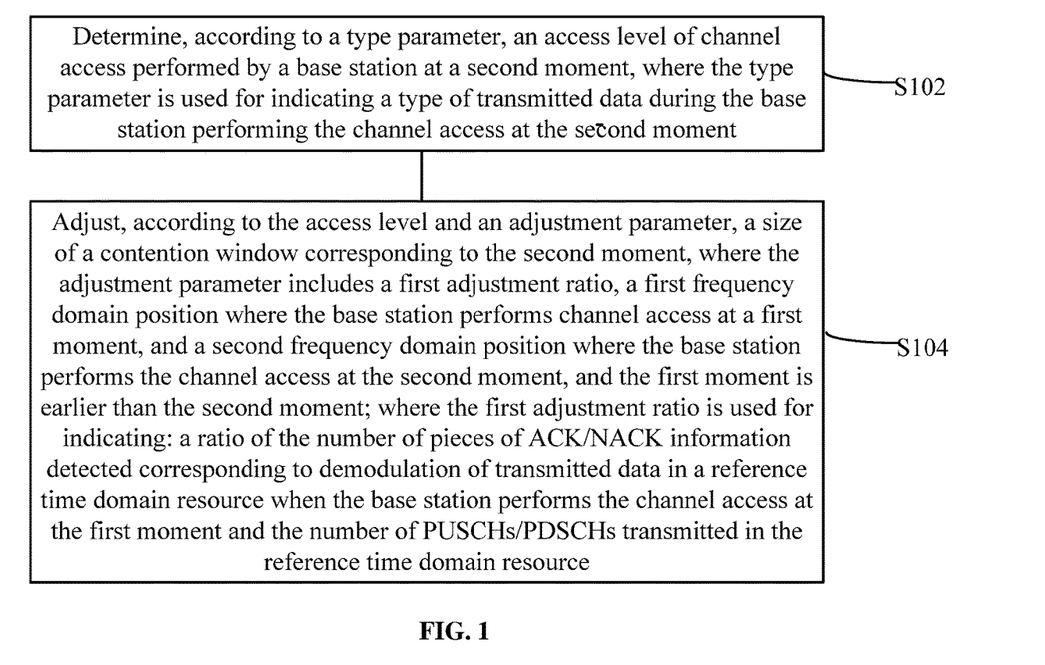
FIG. 1 is a flowchart one of a contention window adjustment method according to an embodiment of the present disclosure.

This embodiment provides a contention window adjustment method. FIG. 1 is a flowchart one of a contention window adjustment method according to an embodiment of the present disclosure. As shown in FIG. 1, the method includes steps S102 and S104.

In step S102, an access level of channel access performed by a base station at a second moment is determined according to a type parameter, where the type parameter is used for indicating a type of transmitted data during the base station performing the channel access at the second moment.

In step S104, a size of a contention window corresponding to the second moment is adjusted according to the access level and an adjustment parameter, where the adjustment parameter includes a first adjustment ratio, a first frequency domain position where the base station performs channel access at a first moment, and a second frequency domain position where the base station performs the channel access at the second moment.

The first adjustment ratio is used for indicating one of the following:

a ratio of the number of pieces of ACK information to the number of PUSCHs, where the pieces of ACK information are detected corresponding to demodulation of transmitted data in a reference time domain resource when the base station performs the channel access at the first moment and the PUSCHs are transmitted in the reference time domain resource; or a ratio of the number of pieces of NACK information to the number of PDSCHs, where the pieces of NACK information are detected corresponding to demodulation of transmitted data in a reference time domain resource when the base station performs the channel access at the first moment and the PDSCHs are transmitted in the reference time domain resource.

According to the method in this embodiment, the access level of the channel access performed by the base station at the second moment can be determined according to the type of transmitted data during the base station performing the channel access at the second moment, and the adjustment of the size of the contention window can be achieved on the basis of the access level and according to the first frequency domain position where the base station performs channel access at the first moment, the second frequency domain position where the base station performs the channel access at the second moment, and the ratio corresponding to ACK information or NACK information detected corresponding to the demodulation of the transmitted data in the reference time domain resource when the base station performs the channel access at the first moment. Therefore, according to the method in this embodiment, the problem can be solved that the adjustment of the contention window cannot be achieved in the NR in the related art, so that the adjustment operation for the contention window can be achieved in the NR.

It is to be further noted that the first moment is a moment before the second moment, and generally, the second moment may be used for indicating the current moment, and the first moment is used for indicating a moment when the last channel access is performed compared to the current moment.

Optionally, the execution body of steps S102 and S104 may be the base station.

Optionally, the execution orders of step S102 and step S104 can be interchanged, that is, step S104 may be executed before step S102.

Optionally, in step S102, the type parameter includes at least one of the following: a traffic type of the transmitted data during the base station performing the channel access at the second moment, a physical channel type of the transmitted data during the base station performing the channel access at the second moment, or a logical channel type of the transmitted data during the base station performing the channel access at the second moment.

Specifically, the traffic type, physical channel type, or logical channel type of the transmitted data during the base station performing the channel access at the second moment determines the access level of the channel in the channel access process, and thus the access level of the channel access performed by the base station at the second moment can be determined based on the above type parameters.

Optionally, in step S104, the step in which the size of the contention window corresponding to the second moment is adjusted according to the access level and the adjustment parameter includes the following steps.

The first adjustment ratio is adjusted according to an overlapping relationship between the first frequency domain position and the second frequency domain position.

The size of the contention window corresponding to the second moment is adjusted according to the access level and the adjusted first adjustment ratio.

Optionally, the step in which the first adjustment ratio is adjusted according to the overlapping relationship between the first frequency domain position and the second frequency domain position includes one of the following manners.

Manner one: in a case where at least part of the second frequency domain position overlaps the first frequency domain position, the first adjustment ratio is adjusted according to a second adjustment ratio, where the second adjustment ratio is used for indicating a ratio of a first bandwidth corresponding to the first frequency domain position to a second bandwidth corresponding to the second frequency domain position.

Manner two: in a case where the first frequency domain position is a subset of the second frequency domain position, the first adjustment ratio is maintained.

Manner three: in a case where no overlap exists between the first frequency domain position and the second frequency domain position, the size of the contention window corresponding to the second moment is adjusted according to a minimum value of the contention window within a value range of the contention window, where the value range corresponds to the access level.

Figure 2:
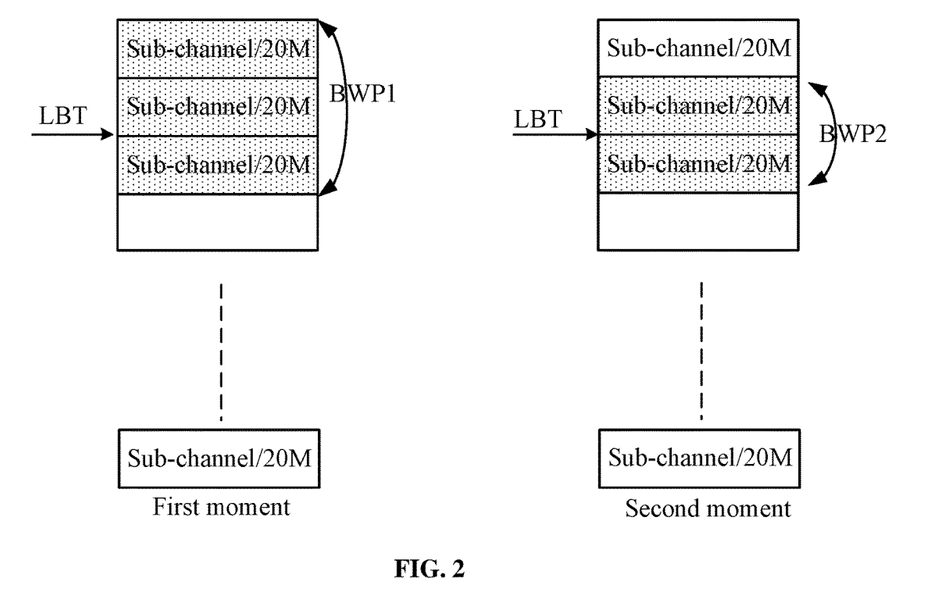
FIG. 2 is a schematic diagram illustrating that a second frequency domain position is a subset of a first frequency domain position.

Specifically, for Manner one, FIG. 2 is a schematic diagram illustrating that a second frequency domain position is a subset of a first frequency domain position, that is, the first frequency domain position includes the second frequency domain position. The sub-channel bandwidth of each sub-channel at the first frequency domain position is 20 M, and the sub-channel bandwidth of each sub-channel at the second frequency domain position is 20 M. In this case, the first adjustment ratio needs to be converted according to a ratio of the bandwidths corresponding to the first frequency domain position and the bandwidths corresponding to the second frequency domain position. For example, at the first moment, the bandwidth BWP1 of the first frequency domain position is 80 M, the number of PDSCHs transmitted in a reference slot is n, and the number of NACKs fed back by the UE is m; and at the second moment, the bandwidth BWP2 of the second frequency domain position is 40 M. In combination with all parameters mentioned above, the adjusted first adjustment ratio should be (1/2)*(m/n).

Figure 3:
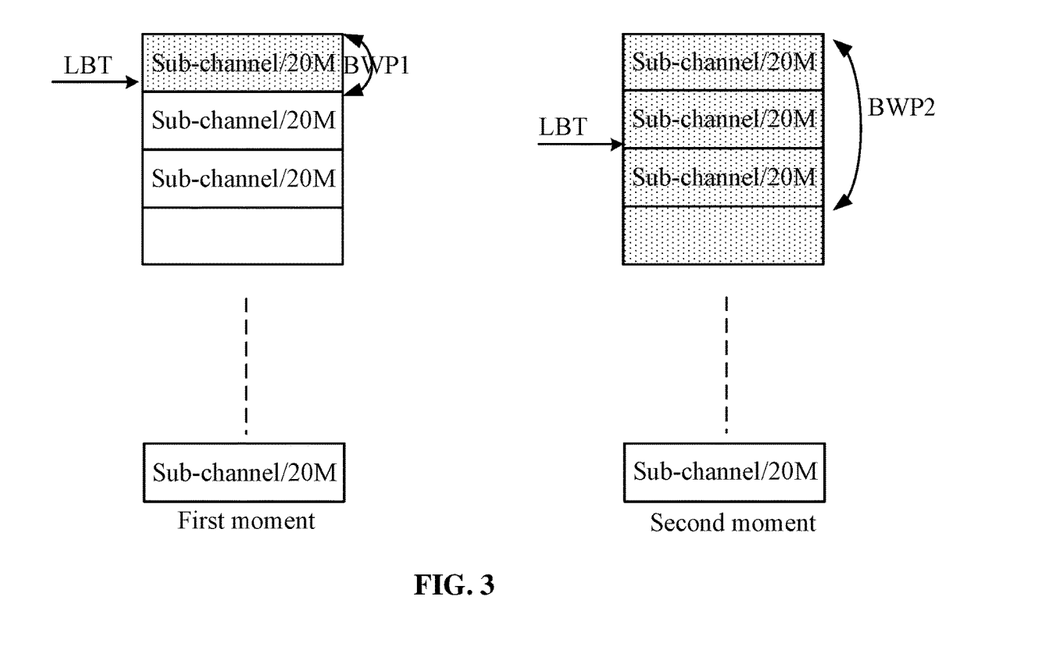
FIG. 3 is a schematic diagram illustrating that a first frequency domain position is a subset of a second frequency domain position.

For Manner two, FIG. 3 is a schematic diagram illustrating that a first frequency domain position is a subset of a second frequency domain position, that is, specifically, the second frequency domain position includes the first frequency domain position. The sub-channel bandwidth of each sub-channel at the first frequency domain position is 20 M, and the sub-channel bandwidth of each sub-channel at the second frequency domain position is 20 M. In this case, the first adjustment ratio corresponding to the first moment may be directly adopted in the channel access performed at the second moment.

In addition, for Manner three, since the first frequency domain position and the second frequency domain position do not overlap each other, the contention window corresponding to the second moment needs to be re-calculated.

Through the above technical scheme, the problem can be solved that the adjustment method for the contention window in the LAA standards cannot be applied in the NR in a case where the BWP in which the base station or the UE performs the LBT in the current time is different from the BWP in which the base station or the UE performs the LBT in the last time.

It is to be further noted that besides Manners one to three, there may be a manner in which the first frequency domain position is not considered, that is, the calculation and adjustment of the contention window may be re-performed without referring to the contention window corresponding to the last moment when the channel access process is performed at each moment. In addition, for a case where the same carrier is used for a first frequency domain resource and a second frequency domain resource, the contention window corresponding to the second moment may be directly adjusted by referring to the adjustment of the contention window at the first moment.

Optionally, the step in which the first adjustment ratio is adjusted according to the overlapping relationship between the first frequency domain position and the second frequency domain position further includes the following step.

In a case where at least part of bandwidths in the second frequency domain position overlaps bandwidths in the first frequency domain position, the first adjustment ratio is adjusted according to a third adjustment ratio, where the third adjustment ratio is used for indicating a ratio of bandwidths in an overlapping area of the first frequency domain position and the second frequency domain position to bandwidths corresponding to the second frequency domain position.

Optionally, the first frequency domain position includes at least one of: a sub-channel in frequency domain, a BWP in frequency domain, or an RB granularity in frequency domain.

Optionally, the second frequency domain position includes at least one of: a sub-channel in frequency domain, a BWP in frequency domain, or an RB granularity in frequency domain.

Specifically, when the relationship between the first frequency domain position and the second frequency domain position is determined, a sub-channel of the frequency domain of the first frequency domain position and a sub-channel of the frequency domain of the second frequency domain position may be selected to compare, or a BWP of the first frequency domain position and a BWP of the second frequency domain position may be selected to compare, or an RB granularity of the first frequency domain position and an RB granularity of the second frequency domain position may be selected to compare.

Optionally, the transmission data type of transmitted data during the base station performing the channel access at the first moment includes: a CBG or a TB.

Optionally, in step S104, the step in which the size of the contention window corresponding to the second moment is adjusted according to the access level and the adjustment parameter includes one of the following manners.

Manner One:

The number of pieces of first NACK information is acquired, where the first NACK information is used for indicating, in response to transmitting data based on the CBG, the NACK information detected corresponding to the demodulation of the transmitted data in the reference time domain resource when the base station performs the channel access at the first moment.

The size of the contention window corresponding to the second moment is adjusted according to the access level and a fourth adjustment ratio, where the fourth adjustment ratio is used for indicating a ratio of the number of the pieces of first NACK information to the number of data blocks transmitted in the reference time domain resource.

Manner Two:

The number of pieces of first NACK information is acquired, where the first NACK information is used for indicating, in response to transmitting data based on the CBG, the NACK information detected corresponding to the demodulation of the transmitted data in the reference time domain resource when the base station performs the channel access at the first moment.

The fourth adjustment ratio is adjusted according to a relationship between the CBG and the TB.

The size of the contention window corresponding to the second moment is adjusted according to the access level and the adjusted fourth adjustment ratio.

Manner Three:

The number of pieces of first sub-NACK information is acquired, where each of the pieces of first sub-NACK information is used for indicating a respective one of pieces of first NACK information, among the pieces of first NACK information, detected corresponding to data transmitted corresponding to the CBG mapped into the reference time domain resource, and the respective one of the pieces of first NACK information is used for indicating, in response to transmitting data based on the CBG, NACK information detected corresponding to the demodulation of the transmitted data in the reference time domain resource when the base station performs the channel access at the first moment.

The size of the contention window corresponding to the second moment is adjusted according to the access level and a ratio of the number of the pieces of first sub-NACK information to the number of data blocks transmitted in the reference time domain resource.

Manner Four:

An NACK information threshold is preset according to a ratio of CBGs and/or TBs in transmitted data blocks to the transmitted data blocks.

The size of the contention window corresponding to the second moment is adjusted according to the access level and the NACK information threshold.

Specifically, in the above Manners one to three, the first adjustment ratio in the adjustment parameters is adjusted according to the CBG and the TB, and the contention window is adjusted through the adjusted first adjustment ratio while in Manner four, the first adjustment ratio is maintained, and the comparison object corresponding to the first adjustment ratio, that is, the NACK information threshold, is adjusted in the process of adjusting the contention window according to the first adjustment ratio. For example, in Manner four, if the transmitted data blocks are all transmitted based on the TB, the NACK information threshold may be set to 80%; if the transmitted data blocks include data transmitted based on the CBG, the NACK information threshold may be appropriately increased, for example, 85%.

In addition, in Manner three, first NACK information detected corresponding to data transmitted corresponding to a CBG that fails to be mapped into the reference time domain resource is not considered.

Optionally, the step in which the fourth adjustment ratio is adjusted according to the relationship between the CBG and the TB includes one of the following manners.

Manner 1: in response to detecting to be the NACK information for transmitted data corresponding to a plurality of CBGs corresponding to the TB, data transmitted based on the TB is counted as first NACK information, and the fourth adjustment ratio is adjusted according to the ratio of the number of the pieces of first NACK information to the number of the data blocks transmitted in the reference time domain resource.

Manner 2: in response to detecting to be the NACK information for transmitted data corresponding to any one of a plurality of CBGs corresponding to the TB, data transmitted based on the TB is counted as NACK information, and the fourth adjustment ratio is adjusted according to a ratio of the number of the pieces of NACK information to the number of the data blocks transmitted in the reference time domain resource.

Manner 3: in a case where the number of CBGs, among a plurality of CBGs corresponding to the TB, for which the transmitted data is detected to be NACK information reaches a predetermined threshold, data transmitted based on the TB is counted as NACK information, and the fourth adjustment ratio is adjusted according to a ratio of the number of the pieces of NACK information to the number of the data blocks transmitted in the reference time domain resource.

Manner four: the fourth adjustment ratio is adjusted according to the number of CBGs corresponding to each of TBs.

Through the above technical scheme, the problem can be solved that the adjustment method for the contention window in the LAA standards cannot be applied in the NR due to the introduction of CBG-based scheduling and the HARQ-ACK feedback of the CBG in the NR.

Optionally, the reference time domain resource is at least one of the following.

In a case where data starts to be transmitted from any one symbol in a symbol set $\{0, 1, 2, 3, 4, 5, 6\}$ after the base station performs the channel access at the first moment, the reference time domain resource is a first slot in which data is transmitted, where the first slot is used for indicating a first one of slots in which data is transmitted.

In a case where data starts to be transmitted from any one symbol in a symbol set $\{7, 8, 9, 10, 11, 12, 13\}$ after the base station performs the channel access at the first moment, the reference time domain resource is a first slot in which data is transmitted and a second slot in which data is transmitted, where the second slot is used for indicating a second one of slots in which data is transmitted.

Optionally, in a case where the transmitted data in the first slot is a PDCCH and the transmitted data in the second slot is a PUSCH, the contention window corresponding to the second moment is expanded in a case where the following condition is satisfied.

The condition is that a ratio of the number of pieces of ACK information generated by transmitting the PUSCH in the second slot to the number of PUSCHs transmitted in the first slot and in the second slot does not reach a preset threshold.

Optionally, in a case where the transmitted data in the first slot is a PDCCH and a PDSCH and the transmitted data in the second slot is a PUSCH, the contention window corresponding to the second moment is expanded in a case where at least the following condition is satisfied.

The condition is that a ratio of the number of pieces of NACK information generated by transmitting the PDSCH in the first slot and by transmitting the PUSCH in the second slot to a sum of the number of PDSCHs transmitted in the first slot and the number of PUSCHs transmitted in the second slot exceeds a preset threshold.

Optionally, the step in which the size of the contention window corresponding to the second moment is adjusted according to the access level and the adjustment parameter includes the following steps.

A value range of the contention window is acquired according to the access level, where the value range corresponds to the access level.

A minimum value of the contention window or a value of a contention window before subjected to adjustment at the second moment is selected, within the value range of the contention window, as an initial value of the contention window corresponding to the second moment for the adjustment.

The size of the contention window corresponding to the second moment is adjusted according to the initial value of the contention window and the adjustment parameter.

It is to be further noted that the value of the contention window before subjected to the adjustment at the second moment is used for indicating a current value of the contention window before the channel access performed at the second moment.

Optionally, the step in which the size of the contention window corresponding to the second moment is adjusted according to the initial value of the contention window and the adjustment parameter includes one of the following steps.

In a case where the first adjustment ratio exceeds a preset threshold and the value of the contention window before subjected to the adjustment at the second moment corresponding to the access level is less than a maximum value of the contention window within the value range, the contention window corresponding to the second moment is expanded.

In a case where the value of the contention window before subjected to the adjustment at the second moment corresponding to the access level is equal to a maximum value of the contention window within the value range, the size of the contention window corresponding to the second moment is maintained.

In a case where the number of times that the value of the contention window before subjected to the adjustment at the second moment corresponding to the access level is equal to a maximum value of the contention window within the value range reaches a preset threshold, a value of the contention window corresponding to the second moment is adjusted as a minimum value of the contention window within the value range.

Optionally, in a case where a PDSCH transmitted in the reference time domain resource is scheduled by a PDCCH corresponding to the first frequency domain position, negative ACK information detected corresponding to the demodulation of the transmitted data in the reference time domain resource when the base station performs the channel access at the first moment is counted as NACK information.

Optionally, in a case where a PDSCH transmitted in the reference time domain resource is scheduled by a PDCCH not corresponding to the first frequency domain position, negative HARQ-ACK information detected corresponding to the demodulation of the transmitted data in the reference time domain resource when the base station performs the channel access at the first moment is ignored.

Optionally, the method further includes the following step: in a case where PDSCHs with a plurality of ports are adopted in the reference time domain resource to send data, NACK information of a respective one PDSCH corresponding to each of the plurality of ports is counted separately.

Through the above technical scheme, the problem can be solved that the reference subframe cannot be determined through the existing fixed timing relationship in the NR because the NR supports flexible scheduling feedback timing, scheduling of the Non-slot, and multiple starting points.

The calculation method for the ratio of NACK information in the method of the embodiment will be further illustrated below through Specific embodiment one.

Specific Embodiment One

In the scenario where the NACK information is not sent successfully due to the failure of channel access, or the base station detects discontinuous transmission (DTX), or the base station detects nothing at this time, the calculation of the ratio of NACK information includes the following scenarios.

Scenario one: in a case where the reference PDSCH for the adjustment is a PDSCH scheduled by the PDCCH of the current BWP, when the base station detects a DTX or other negative ACK information (including that the base station detects nothing), the DTX or negative ACK information is calculated into the number of pieces of NACK information.

For example, the base station sends PDCCH+PDSCH after channel access at the moment n, and then receives HARQ-ACK information corresponding to a PDSCH fed back by the UE at a moment indicated by PDCCH signaling or at a predefined moment. If the base station does not detect corresponding ACK/NACK information or the base station detects a DTX, both cases are calculated as the NACK information.

Scenario two: in a case where the reference PDSCH for the adjustment is a PDSCH which is cross-BWP scheduled by the PDCCH, that is, when the BWP transmitted in the reference slot or the BWP in which the reference PDSCH is transmitted is different from the PDCCH corresponding to the scheduling of the PDSCH, if the base receives no HARQ-ACK information, ignorance is performed, that is, the counting of NACK information is not performed.

Scenario three: if the reference slot is sent by PDSCHs on double layers or a plurality of layers, each piece of corresponding NACK information is calculated into a ratio number.

For example, the base station sends PDSCHs with 64 ports in a first slot after the channel is occupied, and a data packet is sent on each port, and then the detected ratio number of NACK information is 32. Then, the ratio of NACK information is 50%, and the size of the contention window is not adjusted.

How to perform the current contention window adjustment according to the last channel access process in a case of different frame structures within different channel occupation periods in the method of the embodiment will be further illustrated below through Specific embodiment two.

Specific Embodiment Two

The case where the frame structures within the last channel occupation period are different and the reference slots and reference objects are also different specifically includes the following scenarios.

Scenario one: if the frame structure within a COT corresponding to the first moment is PDCCH+PDSCH or PDCCH+PDSCH+UL, where the UL includes at least one of a PUSCH, a physical uplink control channel (PUCCH), or a sounding reference signal (SRS). In this scenario, a demodulation result of the PDSCH in the first slot is referred to, and when it is fed back that the ratio of NACKs corresponding to the PDSCH received in the first slot is greater than or equal to 80%, the base station needs to adjust the value of the contention window to be a next greater value corresponding to the channel access level.

Scenario two: if the frame structure within a COT corresponding to the first moment is PDCCH+PUSCH or PDCCH+PUSCH+DL, where the DL includes at least one of a PDCCH, a PDSCH, or an SSB. In this scenario, a demodulation result of the PUSCH in the first slot is referred to or a demodulation result of the PUSCH in the first slot and a demodulation result of the PUSCH in the second slot are referred to. When transmission starts from the symbol after symbol 7 in the first slot, the first slot and the second slot are referred to. When a ratio of correct demodulation of an uplink data packet is less than 10%, the contention window used by the base station in the current channel access process is increased to a next allowed value.

For example, if the access level p determined in the current channel access is 2 and the candidate values corresponding to the contention window are {7, 15}, the value of the contention window for the current adjustment is 15.

Scenario three: if the frame structures within a COT corresponding to the first moment are a PDCCH, a PDSCH, and a PUSCH. In this scenario, the base station starts transmission from the symbol after symbol 7 and sends PDCCH+PDSCH in the first slot of the COT and PUSCH in the second slot. At this point, the reference object of the adjustment of the contention window is the sum of the ratio of NACKs corresponding to the PDSCH in the first slot and the ratio of NACKs obtained by the base station demodulating the PUSCH in the second slot, and an average value is obtained, or NACKs on both uplink and downlink are calculated, and then the total number of NACKs in the first slot and the second slot is divided by the total number of data packets.

Scenario four: if the frame structure within a COT corresponding to the first moment is PUSCH (including a scheduled PUSCH and a PUSCH corresponding to a configured grant) and DL, where the DL includes at least one of a PDCCH or a PDSCH. When transmission starts before symbol 7 for the uplink, the reference slot is the first slot in the COT, and when transmission starts after symbol 7 for the uplink, the reference slot is the first slot and the second slot. When the second slot is PDCCH+PDSCH, ratios of ACKs in the first slot and the second slot are adjusted to be less than 10%, and then the value of the contention window is increased to a value of a next contention window.

According to the description of the preceding implementations, it will be apparent to those skilled in the art that the method in the preceding embodiment may be implemented by software plus a necessary general-purpose hardware platform or may of course be implemented by hardware. However, in many cases, the former is a preferred implementation. Based on this understanding, the technical scheme provided by the present disclosure substantially, or the part contributing to the existing art, may be embodied in the form of a software product. The computer software product is stored in a storage medium (such as a read-only memory (ROM)/random access memory (RAM), a magnetic disk, or an optical disk) and includes several instructions for enabling a terminal device (which may be a mobile phone, a computer, a server, a network device, etc.) to execute the method according to each embodiment of the present disclosure.

Embodiment Two

Figure 4:
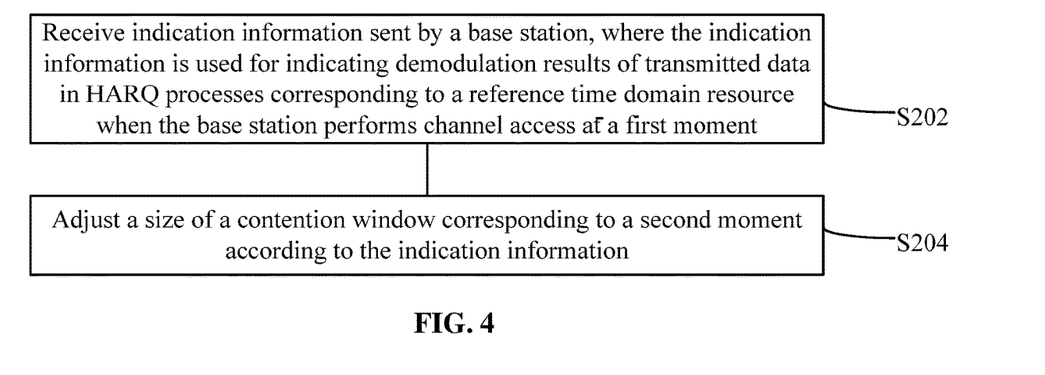
FIG. 4 is a flowchart two of a contention window adjustment method according to an embodiment of the present disclosure.

This embodiment provides a contention window adjustment method. FIG. 4 is a flowchart two of a contention window adjustment method according to an embodiment of the present disclosure. As shown in FIG. 4, the method includes steps S202 and S204.

In step S202, indication information sent by a base station is received, where the indication information is used for indicating demodulation results of transmitted data in HARQ processes corresponding to a reference time domain resource when the base station performs channel access at a first moment.

In step S204, a size of a contention window corresponding to a second moment is adjusted according to the indication information.

Through the method in this embodiment, the indication information sent by the base station is received to indicate the demodulation results of the transmitted data in the HARQ processes corresponding to the reference time domain resource when the base station performs channel access at the first moment, and then the size of the contention window corresponding to the second moment is adjusted according to the indication information. Therefore, according to the method in this embodiment, the problem can be solved that the adjustment of the contention window cannot be achieved in the NR in the related art so that the adjustment operation for the contention window can be achieved in the NR.

Optionally, the execution body of steps S202 and S204 may be a user terminal.

Optionally, the indication information includes at least one of the following: downlink control information of an uplink grant, a DFI, or downlink control information for triggering configured grant retransmission.

Optionally, in step S204, the step in which the size of the contention window corresponding to the second moment is adjusted according to the indication information includes one of the following steps.

In response to reversing an NDI corresponding to at least one HARQ process of the HARQ processes corresponding to the reference time domain resource in the indication information, a minimum value of the contention window within a value range corresponding to an access level corresponding to channel access performed at the second moment is used as a value of the contention window corresponding to the second moment.

In response to displaying DFI corresponding to at least one HARQ process of the HARQ processes corresponding to the reference time domain resource in the indication information as an ACK, a minimum value of the contention window within a value range corresponding to an access level corresponding to channel access performed at the second moment is used as a value of the contention window corresponding to the second moment.

In response to reversion of the NDI and/or display of the DFI information as an NACK occurring in none HARQ process of the HARQ processes corresponding to the reference time domain resource in the indication information, a size of a content window before subjected to adjustment at the second moment corresponding to an access level corresponding to channel access performed at the second moment is expanded within a corresponding value range, and a value of the expanded contention window is used as a value of the contention window corresponding to the second moment.

In response to receiving no UL grant information and/or DFI within a contention window timer, a value of a content window before subjected to adjustment at the second moment corresponding to an access level corresponding to channel access performed at the second moment is used as a value of the contention window for the channel access at the second moment.

Through the description of the preceding implementations, it will be apparent to those skilled in the art that the method in the preceding embodiment may be implemented by software plus a necessary general-purpose hardware platform or may of course be implemented by hardware. However, in many cases, the former is a preferred implementation. Based on this understanding, the technical scheme provided by the present disclosure substantially, or the part contributing to the existing art, may be embodied in the form of a software product. The computer software product is stored in a storage medium (such as an ROM/RAM, a magnetic disk, or an optical disk) and includes several instructions for enabling a terminal device (which may be a mobile phone, a computer, a server, a network device, etc.) to execute the method according to each embodiment of the present disclosure.

Embodiment Three

This embodiment further provides a contention window adjustment apparatus. The apparatus is configured to implement the above-mentioned embodiments and preferred implementations. What has been described will not be repeated. As used below, the term "module" may be software, hardware or a combination thereof capable of implementing predetermined functions. The apparatuses in this embodiment described below are preferably implemented by software, but an implementation by hardware or by a combination of software and hardware is also possible and conceivable.

Figure 5:
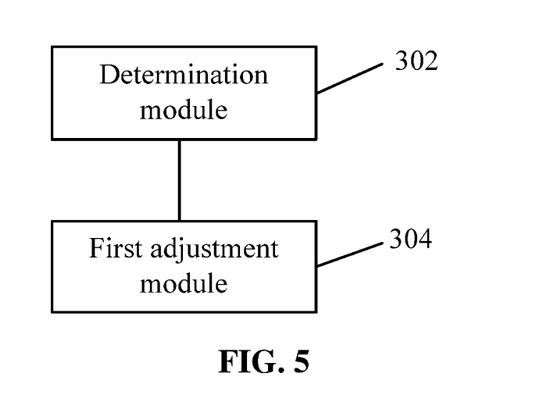
FIG. 5 is a structural diagram one of a contention window adjustment apparatus according to an embodiment of the present disclosure.

FIG. 5 is a structural diagram one of a contention window adjustment apparatus according to an embodiment of the present disclosure. As shown in FIG. 5, the apparatus includes a determination module 302 and a first adjustment module 304.

The determination module 302 is configured to determine, according to a type parameter, an access level of channel access performed by a base station at a second moment, where the type parameter is used for indicating a type of transmitted data during the base station performing the channel access at the second moment.

The first adjustment module 304 is configured to adjust, according to the access level and an adjustment parameter, a size of a contention window corresponding to the second moment, where the adjustment parameter includes a first adjustment ratio, a first frequency domain position where the base station performs channel access at a first moment, and a second frequency domain position where the base station performs the channel access at the second moment.

The first adjustment ratio is used for indicating one of the following:
- a ratio of the number of pieces of ACK information to the number of PUSCHs, where the pieces of ACK information are detected corresponding to demodulation of transmitted data in a reference time domain resource when the base station performs the channel access at the first moment and the PUSCHs are transmitted in the reference time domain resource; or
- a ratio of the number of pieces of NACK information to the number of PDSCHs, where the pieces of NACK information are detected corresponding to demodulation of transmitted data in a reference time domain resource when the base station performs the channel access at the first moment and the PDSCHs are transmitted in the reference time domain resource.

Through the apparatus in this embodiment, the access level of channel access performed by a base station at a second moment can be determined according to the type of transmitted data during the base station performing the channel access at the second moment, and the adjustment of the size of the contention window can be achieved on the basis of the access level and according to the first frequency domain position where the base station performs channel access at the first moment, the second frequency domain position where the base station performs the channel access at the second moment, and the ratio corresponding to ACK information or NACK information detected corresponding to demodulation of transmitted data in the reference time domain resource when the base station performs the channel access at the first moment. Therefore, according to the apparatus in this embodiment, the problem can be solved that the adjustment of the contention window cannot be achieved in the NR in the related art so that the adjustment operation for the contention window can be achieved in the NR.

Optionally, in the determination module 302, the type parameter includes at least one of the following: a traffic type of the transmitted data during the base station performing the channel access at the second moment, a physical channel type of the transmitted data during the base station performing the channel access at the second moment, or a logical channel type of the transmitted data during the base station performing the channel access at the second moment.

Optionally, in the first adjustment module 304, the operation in which the size of the contention window corresponding to the second moment is adjusted according to the access level and the adjustment parameter includes the following operations.

The first adjustment ratio is adjusted according to an overlapping relationship between the first frequency domain position and the second frequency domain position.

The size of the contention window corresponding to the second moment is adjusted according to the access level and the adjusted first adjustment ratio.

Optionally, the operation in which the first adjustment ratio is adjusted according to the overlapping relationship between the first frequency domain position and the second frequency domain position includes one of the following operations.

In a case where at least part of the second frequency domain position overlaps the first frequency domain position, the first adjustment ratio is adjusted according to the following object: a second adjustment ratio, where the second adjustment ratio is used for indicating a ratio of a first bandwidth corresponding to the first frequency domain position to a second bandwidth corresponding to the second frequency domain position.

In a case where the first frequency domain position is a subset of the second frequency domain position, the first adjustment ratio is maintained.

In a case where no overlap exists between the first frequency domain position and the second frequency domain position, the size of the contention window corresponding to the second moment is adjusted according to a minimum value of the contention window within a value range of the contention window, where the value range corresponds to the access level.

In a case where at least part of bandwidths in the second frequency domain position overlaps bandwidths in the first frequency domain position, the first adjustment ratio is adjusted according to a third adjustment ratio, where the third adjustment ratio is used for indicating a ratio of bandwidths in an overlapping area of the first frequency domain position and the second frequency domain position to bandwidths corresponding to the second frequency domain position.

Optionally, the first frequency domain position includes at least one of: a sub-channel in frequency domain, a BWP in frequency domain, or an RB granularity in frequency domain.

The second frequency domain position includes at least one of: a sub-channel in frequency domain, a BWP in frequency domain, or an RB granularity in frequency domain.

Optionally, the transmission data type of transmitted data during the base station performing the channel access at the first moment includes: a CBG or a TB.

Optionally, in the first adjustment module 304, the operation in which the size of the contention window corresponding to the second moment is adjusted according to the access level and the adjustment parameter includes one of the following operations.

The number of pieces of first NACK information is acquired, where the first NACK information is used for indicating, in response to transmitting data based on the CBG, the NACK information detected corresponding to the demodulation of the transmitted data in the reference time domain resource when the base station performs the channel access at the first moment; and the size of the contention window corresponding to the second moment is adjusted according to the access level and one of a fourth adjustment ratio or an adjusted fourth adjustment ratio, where the fourth adjustment ratio is used for indicating a ratio of the number of the pieces of first NACK information to the number of data blocks transmitted in the reference time domain resource, and the adjusted fourth adjustment ratio is an adjustment ratio obtained by adjusting the fourth adjustment ratio according to a relationship between the CBG and the TB.

The number of pieces of first sub-NACK information is acquired, where each of the pieces of first sub-NACK information is used for indicating a respective one of pieces of first NACK information, among the pieces of first NACK information, detected corresponding to data transmitted corresponding to the CBG mapped into the reference time domain resource; and the size of the contention window corresponding to the second moment is adjusted according to the access level and a ratio of the number of the pieces of first sub-NACK information to the number of data blocks transmitted in the reference time domain resource.

An NACK information threshold is preset according to a ratio of CBGs and/or TBs in transmitted data blocks to the transmitted data blocks; and the size of the contention window corresponding to the second moment is adjusted according to the access level and the NACK information threshold.

Optionally, the operation in which the fourth adjustment ratio is adjusted according to the relationship between the CBG and the TB includes one of the following operations.

In response to detecting to be the NACK information for transmitted data corresponding to a plurality of CBGs corresponding to the TB, data transmitted based on the TB is counted as first NACK information, and the fourth adjustment ratio is adjusted according to the ratio of the number of the pieces of first NACK information to the number of the data blocks transmitted in the reference time domain resource.

In response to detecting to be the NACK information for transmitted data corresponding to one of a plurality of CBGs corresponding to the TB, data transmitted based on the TB is counted as NACK information, and the fourth adjustment ratio is adjusted according to a ratio of the number of the pieces of NACK information to the number of the data blocks transmitted in the reference time domain resource.

In a case where the number of CBGs, among a plurality of CBGs corresponding to the TB, for which the transmitted data is detected to be NACK information reaches a predetermined threshold, data transmitted based on the TB is counted as NACK information, and the fourth adjustment ratio is adjusted according to a ratio of the number of the pieces of NACK information to the number of the data blocks transmitted in the reference time domain resource.

The fourth adjustment ratio is adjusted according to the number of CBGs corresponding to each of TBs.

Optionally, the reference time domain resource includes at least one of the following.

In a case where data starts to be transmitted from any one symbol in a symbol set $\{0, 1, 2, 3, 4, 5, 6\}$ after the base station performs the channel access at the first moment, the reference time domain resource is a first slot in which data is transmitted, where the first slot is used for indicating a first one of slots in which data is transmitted.

In a case where data starts to be transmitted from any one symbol in a symbol set $\{7, 8, 9, 10, 11, 12, 13\}$ after the base station performs the channel access at the first moment, the reference time domain resource is a first slot in which data is transmitted and a second slot in which data is transmitted, where the second slot is used for indicating a second one of slots in which data is transmitted.

Optionally, in a case where the transmitted data in the first slot is a PDCCH and the transmitted data in the second slot is a PUSCH, the contention window corresponding to the second moment is expanded in a case where the following condition is satisfied.

The condition is that a ratio of the number of pieces of ACK information generated by transmitting the PUSCH in the second slot to the number of PUSCHs transmitted in the first slot and the second slot does not reach a preset threshold.

Optionally, in a case where the transmitted data in the first slot is a PDCCH and a PDSCH and the transmitted data in the second slot is a PUSCH, the contention window corresponding to the second moment is expanded in a case where at least the following condition is satisfied.

The condition is that a ratio of the number of pieces of NACK information generated by transmitting the PDSCH in the first slot and by transmitting the PUSCH in the second slot to a sum of the number of PDSCHs transmitted in the first slot and the number of PUSCHs transmitted in the second slot exceeds a preset threshold.

Optionally, the operation in which the size of the contention window corresponding to the second moment is adjusted according to the access level and the adjustment parameter includes the following operations.

A value range of the contention window is acquired according to the access level, where the value range corresponds to the access level.

A minimum value of the contention window or a value of a contention window before subjected to adjustment at the second moment is selected, within the value range of the contention window, as an initial value of the contention window corresponding to the second moment for the adjustment.

The size of the contention window corresponding to the second moment is adjusted according to the initial value of the contention window and the adjustment parameter.

Optionally, the operation in which the size of the contention window corresponding to the second moment is adjusted according to the initial value of the contention window and the adjustment parameter includes one of the following operations.

In a case where the first adjustment ratio exceeds a preset threshold and the value of the contention window before subjected to the adjustment at the second moment corresponding to the access level is less than a maximum value of the contention window within the value range, the contention window corresponding to the second moment is expanded.

In a case where the value of the contention window before subjected to the adjustment at the second moment corresponding to the access level is equal to a maximum value of the contention window within the value range, the size of the contention window corresponding to the second moment is maintained.

In a case where the number of times that the value of the contention window before subjected to the adjustment at the second moment corresponding to the access level is equal to a maximum value of the contention window within the value range reaches a preset threshold, a value of the contention window corresponding to the second moment is adjusted as a minimum value of the contention window within the value range.

Optionally, in a case where a PDSCH transmitted in a reference time domain resource is scheduled by a PDCCH corresponding to the first frequency domain position, negative ACK information detected corresponding to the demodulation of the transmitted data in the reference time domain resource when the base station performs the channel access at the first moment is counted as NACK information.

Optionally, in a case where a PDSCH transmitted in the reference time domain resource is scheduled by a PDCCH not corresponding to the first frequency domain position, negative HARQ-ACK information detected corresponding to the demodulation of the transmitted data in the reference time domain resource when the base station performs the channel access at the first moment is ignored.

Optionally, in a case where PDSCHs with a plurality of ports are adopted in the reference time domain resource to send data, NACK information of a respective one PDSCH corresponding to each of the plurality of ports is counted separately.

It is to be noted that the various modules described above may be implemented by software or hardware. An implementation by hardware may, but may not necessarily, be performed in the following manners: the various modules described above are located in the same processor, or the various modules described above are located in their respective processors in any combination form.

Embodiment Four

This embodiment further provides a contention window adjustment apparatus. The apparatus is configured to implement the above-mentioned embodiments and preferred implementations. What has been described will not be repeated. As used below, the term "module" may be software, hardware or a combination thereof capable of implementing predetermined functions. The apparatuses in this embodiment described below are preferably implemented by software, but an implementation by hardware or by a combination of software and hardware is also possible and conceivable.

Figure 6:
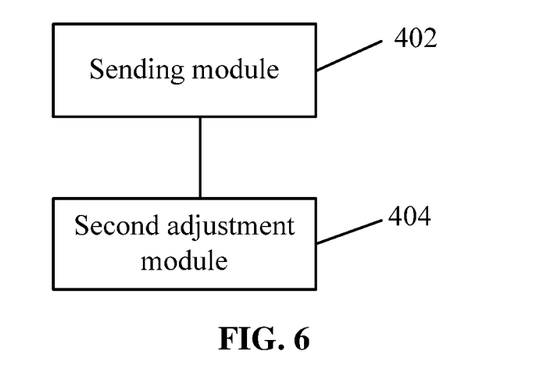
FIG. 6 is a structural diagram two of a contention window adjustment apparatus according to an embodiment of the present disclosure.

FIG. 6 is a structural diagram two of a contention window adjustment apparatus according to an embodiment of the present disclosure. As shown in FIG. 6, the apparatus includes a reception module 402 and a second adjustment module 404.

The reception module 402 is configured to receive indication information sent by a base station, where the indication information is used for indicating demodulation results of transmitted data in HARQ processes corresponding to a reference time domain resource when the base station performs channel access at a first moment.

The second adjustment module 404 is configured to adjust a size of a contention window corresponding to a second moment according to the indication information.

Through the apparatus in this embodiment, the indication information sent by the base station is received to indicate the demodulation results of the transmitted data in the HARQ processes corresponding to the reference time domain resource when the base station performs the channel access at the first moment, and then the size of the contention window corresponding to the second moment can be adjusted according to the indication information. Therefore, according to the apparatus in this embodiment, the problem can be solved that the adjustment of the contention window cannot be achieved in the NR in the related art, so that the adjustment operation for the contention window can be achieved in the NR.

Optionally, the indication information includes at least one of the following: downlink control information of an uplink grant, DFI, or downlink control information for triggering configured grant retransmission.

Optionally, in the second adjustment module 404, the operation in which the size of the contention window corresponding to the second moment is adjusted according to the indication information includes one of the following operations.

In response to reversing an NDI corresponding to at least one HARQ process of the HARQ processes corresponding to the reference time domain resource in the indication information, a minimum value of the contention window within a value range corresponding to an access level corresponding to channel access performed at the second moment is used as a size of the contention window corresponding to the second moment.

In response to displaying DFI corresponding to at least one HARQ process of the HARQ processes corresponding to the reference time domain resource in the indication information as an ACK, a minimum value of the contention window within a value range corresponding to an access level corresponding to channel access performed at the second moment is used as a size of the contention window corresponding to the second moment.

In response to reversion of the NDI and/or display of the DFI information as an NACK occurring in none HARQ process of the HARQ processes corresponding to the reference time domain resource in the indication information, a size of a content window before subjected to adjustment at the second moment corresponding to an access level corresponding to channel access performed at the second moment is expanded within a corresponding value range, and a value of the expanded contention window is used as a value of the contention window corresponding to the second moment.

In response to receiving no UL grant information and/or DFI within a contention window timer, a value of a content window before subjected to adjustment at the second moment corresponding to an access level corresponding to channel access performed at the second moment is used as a value of the contention window for the channel access at the second moment.

It is to be noted that the various modules described above may be implemented by software or hardware. An implementation by hardware may, but may not necessarily, be performed in the following manners: the various modules described above are located in the same processor, or the various modules described above are located in their respective processors in any combination form.

Embodiment Five

This embodiment further provides a storage medium. The storage medium has a computer program stored thereon. The computer program is configured to, when executed, perform the steps in any one of the preceding method embodiments.

Optionally, in the embodiment, the preceding storage medium may be configured to store a computer program for performing steps described below.

In step S1, an access level of channel access performed by a base station at a second moment is determined according to a type parameter, where the type parameter is used for indicating a type of transmitted data during the base station performing the channel access at the second moment.

In step S2, a size of a contention window corresponding to the second moment is adjusted according to the access level and an adjustment parameter, where the adjustment parameter includes a first adjustment ratio, a first frequency domain position where the base station performs channel access at a first moment, and a second frequency domain position where the base station performs the channel access at the second moment.

The first adjustment ratio is used for indicating one of the following:
- a ratio of the number of pieces of ACK information to the number of PUSCHs, where the pieces of ACK information are detected corresponding to demodulation of transmitted data in a reference time domain resource when the base station performs channel access at the first moment and the PUSCHs are transmitted in the reference time domain resource; or
- a ratio of the number of pieces of NACK information to the number of PDSCHs, where the pieces of NACK information are detected corresponding to demodulation of transmitted data in a reference time domain resource when the base station performs channel access at the first moment and the PDSCHs are transmitted in the reference time domain resource.

Optionally, in the embodiment, the preceding storage medium may include, but is not limited to, a USB flash drive, an ROM, an RAM, a mobile hard disk, a magnetic disk, an optical disk or another medium capable of storing a computer program.

Embodiment Six

This embodiment further provides a storage medium. The storage medium has a computer program stored thereon. The computer program is configured to, when executed, perform the steps in any one of the preceding method embodiments.

Optionally, in the embodiment, the preceding storage medium may be configured to store a computer program for performing steps described below.

In step S1', indication information sent by a base station is received, where the indication information is used for indicating demodulation results of transmitted data in HARQ processes corresponding to a reference time domain resource when the base station performs channel access at a first moment.

In step S2', a size of a contention window corresponding to a second moment is adjusted according to the indication information.

Optionally, in the embodiment, the preceding storage medium may include, but is not limited to, a USB flash drive, an ROM, an RAM, a mobile hard disk, a magnetic disk, an optical disk or another medium capable of storing a computer program.

Embodiment Seven

According to an embodiment of the present disclosure, an electronic apparatus is further provided and includes a memory and a processor. The memory is configured to store a computer program, and the processor is configured to execute the computer program to perform the steps in any one of the preceding method embodiments.

Optionally, the electronic apparatus may further include a transmission device and an input/output device. Both the transmission device and the input/output device are connected to the processor.

Optionally, in the embodiment, the processor may be configured to perform the following steps through a computer program.

In step S1", an access level of channel access performed by a base station at a second moment is determined according to a type parameter, where the type parameter is used for indicating a type of transmitted data during the base station performing the channel access at the second moment.

In step S2", a size of a contention window corresponding to the second moment is adjusted according to the access level and an adjustment parameter, where the adjustment parameter includes a first adjustment ratio, a first frequency domain position where the base station performs channel access at a first moment, and a second frequency domain position where the base station performs the channel access at the second moment.

The first adjustment ratio is used for indicating one of the following:
- a ratio of the number of pieces of ACK information to the number of PUSCHs, where the pieces of ACK information are detected corresponding to demodulation of transmitted data in a reference time domain resource when the base station performs channel access at the first moment and the PUSCHs are transmitted in the reference time domain resource; or
- a ratio of the number of pieces of NACK information to the number of PDSCHs, where the pieces of NACK information are detected corresponding to demodulation of transmitted data in a reference time domain resource when the base station performs channel access at the first moment and the PDSCHs are transmitted in the reference time domain resource.

Optionally, for specific examples in this embodiment, refer to the examples described in the embodiments and optional implementations above, which are not repeated in this embodiment.

Embodiment Eight

The embodiment of the present disclosure further provides an electronic device. The electronic device includes a memory and a processor. The memory is configured to store a computer program, and the processor is configured to execute the computer program to perform the steps in any one of the preceding method embodiments.

Optionally, the electronic apparatus may further include a transmission device and an input/output device. Both the transmission device and the input/output device are connected to the processor.

Optionally, in the embodiment, the processor may be configured to perform the following steps through a computer program.

In step S10, indication information sent by a base station is received, where the indication information is used for indicating demodulation results of transmitted data in HARQ processes corresponding to a reference time domain resource when the base station performs channel access at a first moment.

In step S20, a size of a contention window corresponding to a second moment is adjusted according to the indication information.

Optionally, for specific examples in this embodiment, refer to the examples described in the embodiments and optional implementations above, which are not repeated in this embodiment.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and optionally, the modules or steps may be implemented by program codes executable by the computing device, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made in accordance with the principles of the present disclosure are within the scope of the present disclosure.

What is claimed is:

1. A contention window adjustment method comprising:
   receiving, by a user equipment (UE), indication information sent by a base station, wherein the indication information is configured for indicating results of demodulating transmitted data by the base station in a hybrid automatic repeat request ("HARQ") processes corresponding to a reference time domain resource when channel access is performed by the base station at a first moment,
wherein the indication information comprises downlink control information of an uplink ("UL") grant or downlink feedback information ("DFI"); and
   adjusting, by the UE, a size of a contention window corresponding to a second moment according to the indication information, wherein the first moment is earlier than the second moment,
wherein the adjusting the size of the contention window further comprises:
   in response to determining that the DFI in the indication information indicates an acknowledgement ("ACK"), corresponding to at least one HARQ process of the HARQ processes corresponding to the reference time domain resource, using a minimum value of the contention window within a value range corresponding to an access level corresponding to channel access performed at the second moment as a value of the contention window corresponding to the second moment;
   in response to determining that the DFI in the indication information indicates a negative acknowledgement ("NACK"), increasing, within a corresponding value range, a size of a content window before adjustment at the second moment corresponding to an access level corresponding to channel access performed at the second moment, and using a value of the increased contention window as a value of the contention window corresponding to the second moment; or
   in response to determining that the UE received no uplink grant ("UL") grant, information and/or DFI within a contention window timer, using a value of a content window before adjustment at the second moment corresponding to an access level corresponding to channel access performed at the second moment as a value of the contention window for the channel access at the second moment.

2. A contention window adjustment apparatus, comprising a user equipment (UE) comprising a processor configured to:
   receive indication information sent by a base station, wherein the indication information is used for indicating results of demodulating transmitted data by the base station in hybrid automatic repeat request ("HARQ") processes corresponding to a reference time domain resource when channel access is performed by the base station at a first moment,
wherein the indication information comprises downlink control information of an uplink ("UL") grant or downlink feedback information ("DFI"); and
   adjust a size of a contention window corresponding to a second moment according to the indication information, wherein the first moment is earlier than the second moment,
   wherein the processor is configured to adjust the size of the contention window corresponding to the second moment according to the indication information by:
   in response to determining that the DFI in the indication information indicates an acknowledgement ("ACK"), corresponding to at least one HARQ process of the HARQ processes corresponding to the reference time domain resource, using a minimum value of the contention window within a value range corresponding to an access level corresponding to channel access performed at the second moment as a value of the contention window corresponding to the second moment;
   in response to determining that the DFI in the indication information indicates a negative acknowledgement ("NACK"), increasing, within a corresponding value range, a size of a content window before adjustment at the second moment corresponding to an access level corresponding to channel access performed at the second moment, and using a value of the increased contention window as a value of the contention window corresponding to the second moment; or
   in response to determining that the UE received no uplink grant ("UL") grant, information and/or DFI within a contention window timer, using a value of a content window before adjustment at the second moment corresponding to an access level corresponding to channel access performed at the second moment as a value of the contention window for the channel access at the second moment.

3. A non-transitory computer readable storage medium having a computer program stored thereon, wherein the computer program is configured to, when executed, perform:

receiving, by a user equipment (UE), indication information sent by a base station, wherein the indication information is used for indicating results of demodulating transmitted data by the base station in hybrid automatic repeat request ("HARQ") processes corresponding to a reference time domain resource when channel access is performed by the base station at a first moment, wherein the indication information comprises downlink control information of an uplink ("UL") grant or downlink feedback information ("DFI"); and adjusting, by the UE, a size of a contention window corresponding to a second moment according to the indication information, wherein the first moment is earlier than the second moment, wherein adjusting the size of the contention window corresponding to the second moment according to the indication information comprises one of the following that:

in response to determining that the DFI in the indication information indicates an acknowledgement ("ACK"), corresponding to at least one HARQ process of the HARQ processes corresponding to the reference time domain resource, using a minimum value of the contention window within a value range corresponding to an access level corresponding to channel access performed at the second moment as a value of the contention window corresponding to the second moment;

in response to determining that the DFI in the indication information indicates a negative acknowledgement ("NACK"), increasing, within a corresponding value range, a size of a content window before adjustment at the second moment corresponding to an access level corresponding to channel access performed at the second moment, and using a value of the increased contention window as a value of the contention window corresponding to the second moment; or in response to determining that the UE received no uplink grant ("UL") grant, information and/or DFI within a contention window timer, using a value of a content window before adjustment at the second moment corresponding to an access level corresponding to channel access performed at the second moment as a value of the contention window for the channel access at the second moment.

4. A contention window adjustment method, comprising:

determining an access level of channel access performed by a base station at a second moment, wherein the access level of channel access is used for indicating a type of transmitted data during the base station performing the channel access at the second moment; and adjusting, by the base station, according to the access level and an adjustment parameter, a size of a contention window corresponding to the second moment, wherein the adjustment parameter comprises a first adjustment ratio;

wherein the first adjustment ratio is used for indicating a ratio of a number of pieces of negative acknowledgement (NACK) information to a number of physical downlink shared channels (PDSCHs), and wherein adjusting, according to the access level and the adjustment parameter, the size of the contention window corresponding to the second moment comprises:

adjusting the first adjustment ratio according to an overlapping relationship between a first frequency domain position where the base station performs channel access at a first moment and a second frequency domain position where the base station performs the channel access at the second moment, wherein the first moment is earlier than the second moment; and adjusting the size of the contention window corresponding to the second moment according to the access level and the adjusted first adjustment ratio.

5. The method of claim 4, wherein adjusting, according to the access level and the adjustment parameter, the size of the contention window corresponding to the second moment comprises:

acquiring a value range of the contention window according to the access level, wherein the value range corresponds to the access level;

selecting, within the value range of the contention window, a minimum value of the contention window as an initial value of the contention window corresponding to the second moment for the adjustment; and adjusting the size of the contention window corresponding to the second moment according to the initial value of the contention window and the adjustment parameter.

6. The method of claim 5, wherein adjusting the size of the contention window corresponding to the second moment according to the initial value of the contention window and the adjustment parameter comprises one of the following that:

in a case where the first adjustment ratio exceeds a preset threshold and the value of the contention window before the adjustment at the second moment corresponding to the access level is less than a maximum value of the contention window within the value range, expanding the contention window corresponding to the second moment;

in a case where the value of the contention window before the adjustment at the second moment corresponding to the access level is equal to a maximum value of the contention window within the value range, maintaining the size of the contention window corresponding to the second moment; or in a case where a number of times that the value of the contention window before the adjustment at the second moment corresponding to the access level is equal to a maximum value of the contention window within the value range reaches a preset threshold, adjusting a value of the contention window corresponding to the second moment as a minimum value of the contention window within the value range.

* * * * *